(12) United States Patent
Hashimoto et al.

(10) Patent No.: US 8,309,876 B2
(45) Date of Patent: Nov. 13, 2012

(54) ELECTRIC DISCHARGE MACHINING APPARATUS AND ELECTRIC DISCARGE MACHINING METHOD

(75) Inventors: Takashi Hashimoto, Chiyoda-ku (JP); Takashi Yuzawa, Chiyoda-ku (JP); Koichiro Hattori, Chiyoda-ku (JP); Yoshikazu Ukai, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 305 days.

(21) Appl. No.: 12/865,655

(22) PCT Filed: Jan. 31, 2008

(86) PCT No.: PCT/JP2008/051552
§ 371 (c)(1),
(2), (4) Date: Jul. 30, 2010

(87) PCT Pub. No.: WO2009/096025
PCT Pub. Date: Aug. 6, 2009

(65) Prior Publication Data
US 2011/0000889 A1    Jan. 6, 2011

(51) Int. Cl.
*B23H 1/00* (2006.01)
(52) U.S. Cl. ................. 219/69.13; 219/69.11; 219/69.18
(58) Field of Classification Search ............. 219/68, 219/69.1, 69.11–69.19
See application file for complete search history.

(56) References Cited

U.S. PATENT DOCUMENTS

| | | | | |
|---|---|---|---|---|
| 5,317,122 | A * | 5/1994 | Ito et al. ............ | 219/69.18 |
| 6,222,149 | B1 * | 4/2001 | Toyonaga et al. ...... | 219/69.13 |
| 6,278,075 | B1 | 8/2001 | Kamiguchi et al. | |
| 6,660,957 | B1 * | 12/2003 | Ohguro et al. ......... | 219/69.13 |
| 6,903,297 | B2 | 6/2005 | Goto et al. | |
| 2007/0289949 | A1 * | 12/2007 | Suzuki et al. .......... | 219/69.13 |
| 2008/0017614 | A1 * | 1/2008 | Oda et al. ............. | 219/69.13 |

FOREIGN PATENT DOCUMENTS

| | | |
|---|---|---|
| JP | 61-203221 A | 9/1986 |
| JP | 61-274811 A | 12/1986 |
| JP | 05-329710 A | 12/1993 |
| JP | 11-235621 A | 8/1999 |
| JP | 11-347842 A | 12/1999 |
| JP | 11-347844 A | 12/1999 |
| JP | 11-347846 A | 12/1999 |
| WO | 02/102538 A1 | 12/2002 |

OTHER PUBLICATIONS

Reply for PCT (JP2008/051552), Mar. 11, 2008, Mitsubishi Electric Corporation, with translation.

* cited by examiner

*Primary Examiner* — Kimberly Rizkallah
*Assistant Examiner* — Duy T Nguyen
(74) *Attorney, Agent, or Firm* — Sughrue Mion, PLLC (57) ABSTRACT

In a waveform of switching signals, which is output from a full-bridge circuit formed of four switching elements, includes a normal polarity pulse group and a reversed polarity pulse group for controlling an output timing of voltage pulses. A duty cycle of the normal polarity pulse group containing a plurality of normal polarity pulses, which apply a positive power-supply polarity to a workpiece and apply a negative power-supply polarity to a machining-purpose electrode, is configured so as to be different from a duty cycle of the reversed polarity pulse group containing a plurality of reversed polarity pulses, which apply a negative power-supply polarity to the workpiece and apply a positive power-supply polarity to the machining-purpose electrode.

7 Claims, 8 Drawing Sheets

(d) INTER-ELECTRODE VOLTAGE

ELECTRIC DISCHARGE MACHINING APPARATUS AND ELECTRIC DISCARGE MACHINING METHOD

CROSS REFERENCE TO RELATED APPLICATIONS

This application is a National Stage of International Application No. PCT/JP2008/051552 filed Jan. 31, 2008, the disclosure of which is incorporated herein by reference.

TECHNICAL FIELD

The present invention relates to an electric discharge machining apparatus and an electric discharge machining method for performing a machining process using electric discharges on a workpiece.

BACKGROUND ART

Electric discharge machining apparatuses perform a machining process on a workpiece by generating arc discharges between a machining-purpose electrode and the workpiece. Electric discharge machining apparatuses require an electric power source (i.e., a machining-purpose electric power supply) that is used for generating the arc discharges. Conventionally, various configurations of machining-purpose electric power supplies are known.

For example, a known electric power supply device for electric discharge machining processes is configured so as to include two power supply units that are namely a finishing-purpose power supply unit and a rough-machining-purpose power supply unit. The device is further configured such that a resistor is connected in series to each of four switching elements structuring a full-bridge circuit included in the finishing-purpose power supply unit and that the resistance values of these resistors are different from one another (see, for example, Patent Document 1).

According to Patent Document 1, a normal polarity machining process, during which a positive potential is applied to a workpiece and a negative potential is applied to a machining-purpose electrode, and a reversed polarity machining process, during which a negative potential is applied to the workpiece and a positive potential is applied to the machining-purpose electrode, are performed. The resistance values described above are set in such a manner that the value of a machining electric current supplied to an electric discharge machining gap is small during the normal polarity machining process and is large during the reversed polarity machining process. With this arrangement, during the normal polarity machining process, a small machining voltage is applied to the electric discharge machining gap so that the degree of surface roughness of a surface on which the electric discharge machining is performed is inhibited from becoming higher. In addition, when the reversed polarity machining process is to be finished, the electric discharge is cut off without fail. Furthermore, during the reversed polarity machining process, a large machining voltage is applied to the electric discharge machining gap so that the electric discharges occur in a stable manner, while it is possible to perform the machining process with a low degree of surface roughness.

Patent Document 1: Japanese Patent Application Laid-open No. H11-347844

DISCLOSURE OF INVENTION

Problem to be Solved by the Invention

The electric power supply device for electric discharge machining processes according to Patent Document 1, however, requires that a resistor be provided for each of the four switching elements structuring the bridge circuit included in the finishing-purpose power supply unit and also requires selecting resistors having mutually different resistance values. Thus, a problem remains where the number of components being used and the number of types of components being used are increased, and the configuration of the device is complicated.

In view of the circumstances described above, it is an object of the present invention to provide an electric discharge machining apparatus and an electric discharge machining method with which it is possible to inhibit the structure of the apparatus from becoming complicated and to inhibit the number of components being used from increasing.

Means for Solving Problem

An electric discharge machining apparatus according to an aspect of the present invention, that applies a plurality of sequential voltage pulses between a machining-purpose electrode and a workpiece and performs a machining process while switching polarities for each certain number of voltage pulses, includes: an electric power supply device that supplies a direct-current voltage; a full-bridge circuit in which four switching elements are connected in a full-bridge connection, the full-bridge circuit having a pair of direct-current terminals, to which the electric power supply device is connected, and a pair of alternating-current terminals, to which the machining-purpose electrode and the workpiece are connected, the full-bridge circuit being configured to convert the direct-current voltage supplied from the electric power supply device to a voltage pulse for performing a normal polarity machining process and to a voltage pulse for performing a reversed polarity machining process, and to output the voltage pulses resulting from the conversions; and a controlling unit that, based on machining information that is required to perform an electric discharge machining process, generates switching signals containing a normal polarity pulse group and a reversed polarity pulse group used for controlling an output timing of the voltage pulses output from the full-bridge circuit and controls the four switching elements by using the generated switching signals, wherein within a waveform of the switching signals, a duty cycle of the normal polarity pulse group formed of a plurality of normal polarity pulses is configured so as to be different from a duty cycle of the reversed polarity pulse group formed of a plurality of reversed polarity pulses.

Effect of the Invention

The electric discharge machining apparatus according to an aspect of the present invention is configured so that, with respect to the switching signal waveform containing the normal polarity pulse group and the reversed polarity pulse group used for controlling the output timing of the voltage pulses that are output from the full-bridge circuit, the duty cycle of the normal polarity pulse group containing the plurality of normal polarity pulses is configured so as to be different from the duty cycle of the reversed polarity pulse group containing the plurality of reversed polarity pulses. Thus, an advantageous effect is achieved where it is possible to provide an electric discharge machining apparatus and an electric discharge machining method with which it is possible to inhibit the structure of the apparatus from becoming complicated and to inhibit the number of components being used from increasing.

EXPLANATIONS OF LETTERS OR NUMERALS

1: Electric discharge machining apparatus
3: Power supply and electric discharge machining unit
4: Controlling unit
5: Superordinate controller
6: Machining parameter
7: Operation recognition processing unit
10: Direct-current (DC) power supply
11: Workpiece
12: Machining-purpose electrode
13: Resistor
14: Stray capacitance
15: Stray resistance
16: Voltage detector

BEST MODE(S) FOR CARRYING OUT THE INVENTION

In the following sections, exemplary embodiments of an electric discharge machining apparatus and an electric discharge machining method according to the present invention will be explained in detail, with reference to the accompanying drawings. The present invention is not limited to the exemplary embodiments described below.

First Embodiment

Figure 1:
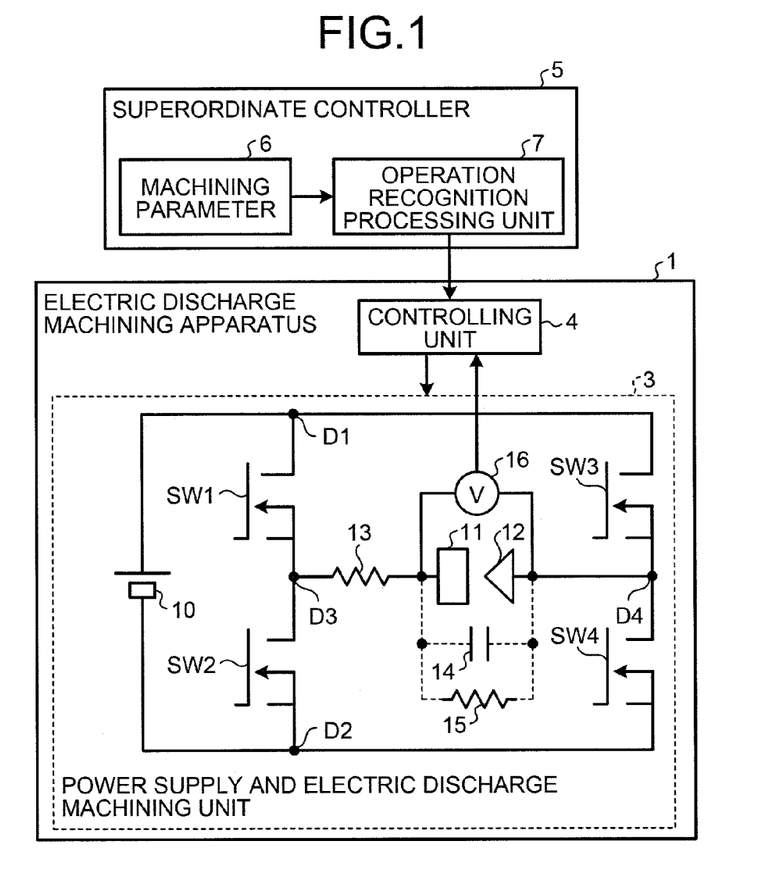
FIG. 1 depicts a schematic diagram of an electric discharge machining apparatus according to a first embodiment of the present invention.

FIG. 1 depicts a schematic diagram of an electric discharge machining apparatus according to a first embodiment of the present invention. FIG. 1 is a functional block diagram in which an electric power supply (hereinafter, a "power supply") is shown in the center. In FIG. 1, an electric discharge machining apparatus 1 includes a power supply and electric discharge machining unit 3 and a controlling unit 4.

In the power supply and electric discharge machining unit 3, circuit elements, such as switching elements SW1 to SW4 and a resistor 13, and functional elements, such as a voltage detector 16, are provided in the surroundings of a workpiece 11 and a machining-purpose electrode 12 that are positioned so as to oppose each other.

More specifically, a full-bridge circuit is structured by connecting the four switching elements (i.e., SW1 to SW4) so as to form a full-bridge connection. In the full-bridge circuit, a pair of direct-current terminals (hereinafter, "DC terminals") are structured by a terminal D1, to which an end of the switching element SW1 and an end of the switching element SW3 are connected, and a terminal D2, to which an end of the switching element SW2 and an end of the switching element SW4 are connected. Also, a pair of alternating-current terminals (hereinafter, "AC terminals") are structured by a terminal D3, to which the switching elements SW1 and SW2 are connected, and a terminal D4, to which the switching elements SW3 and SW4 are connected. In the full-bridge circuit that is structured in this manner, a positive terminal of a direct-current power supply (hereinafter, the "DC power supply") 10 is connected to the terminal D1 of the DC terminals, whereas a negative terminal of the DC power supply 10 is connected to the terminal D2 of the DC terminals. Further, the workpiece 11 is connected to the terminal D3 of the AC terminals via the resistor 13, whereas the machining-purpose electrode 12 is connected to the terminal D4 of the AC terminals.

In the configuration shown in FIG. 1, the example is shown in which the resistor 13 is connected on the workpiece 11 side. Alternatively, another arrangement is acceptable in which the resistor 13 is connected on the machining-purpose electrode 12 side. In yet another arrangement, the resistor 13 may be omitted if the electric current flowing between the workpiece 11 and the machining-purpose electrode 12 is not so large.

Further, a stray capacitance component and a stray resistance component are present between the workpiece 11 and the machining-purpose electrode 12. The stray resistance component is determined by, for example, the shapes and the sizes of the workpiece 11 and the machining-purpose electrode 12 or the distance (i.e., the inter-electrode distance) between the workpiece 11 and the machining-purpose electrode 12. The stray resistance component is determined by, for example, the type of machining fluid and the material of which the workpiece 11 is made. Thus, these stray components are shown as a stray capacitance 14 and a stray resistance 15 that are connected between two ends of the workpiece 11 and the machining-purpose electrode, as indicated with broken lines in FIG. 1.

Further, the power supply and electric discharge machining unit 3 is provided with a voltage detector 16 that detects a voltage (hereinafter, an "inter-electrode voltage") occurring between the workpiece 11 and the machining-purpose electrode 12. The voltage that has been detected by the voltage detector 16 is input to the controlling unit 4.

Further, a superordinate controller 5 containing a machining parameter 6 and an operation recognition processing unit 7 is provided on the outside of the electric discharge machining apparatus 1. The machining parameter 6 includes information indicating machining operations and machining conditions. Based on the information included in the machining parameter 6, the operation recognition processing unit 7 recognizes control information (hereinafter, "machining information") that is required to perform the electric discharge machining process and transfers the recognized control information to the controlling unit 4. In this situation, the control information includes, for example, information regarding voltage polarities such as whether a normal polarity machining process is to be performed or a reversed polarity machining process is to be performed, or both of the processes are to be used, as well as information indicating which of the following is regarded as important: machining speed, surface roughness, electrode wear, and straightness.

By using the machining information that is output from the operation recognition processing unit 7, the controlling unit 4 determines a voltage (hereinafter, an "inter-electrode applied voltage") that should be applied between the workpiece 11 and the machining-purpose electrode 12. Further, the controlling unit 4 determines a pulse width (i.e., a pulse applying period), a pulse pause width (i.e., a pulse pause period), and a ratio (i.e., a duty cycle) of a pulse width to a pulse period (i.e., the sum of the pulse width and the pulse pause width) with respect to a pulse signal used for exercising switching control on the switching elements SW1 to SW4. The switching elements SW1 to SW4 are controlled based on the switching signal that is output from the controlling unit 4. A desired inter-electrode applied voltage is supplied between the workpiece 11 and the machining-purpose electrode 12.

Further, the controlling unit 4 exercises control called "zero-volt control", by using the detected voltage that has been detected by the voltage detector 16. In this situation, the zero-volt control is performed for the purpose of inhibiting an electrolytic corrosion phenomenon that may be caused due to the electric current flowing between the workpiece 11 and the machining-purpose electrode 12. The zero-volt control prevents the polarity of the machining fluid from becoming imbalanced with one polarity.

Figure 2:
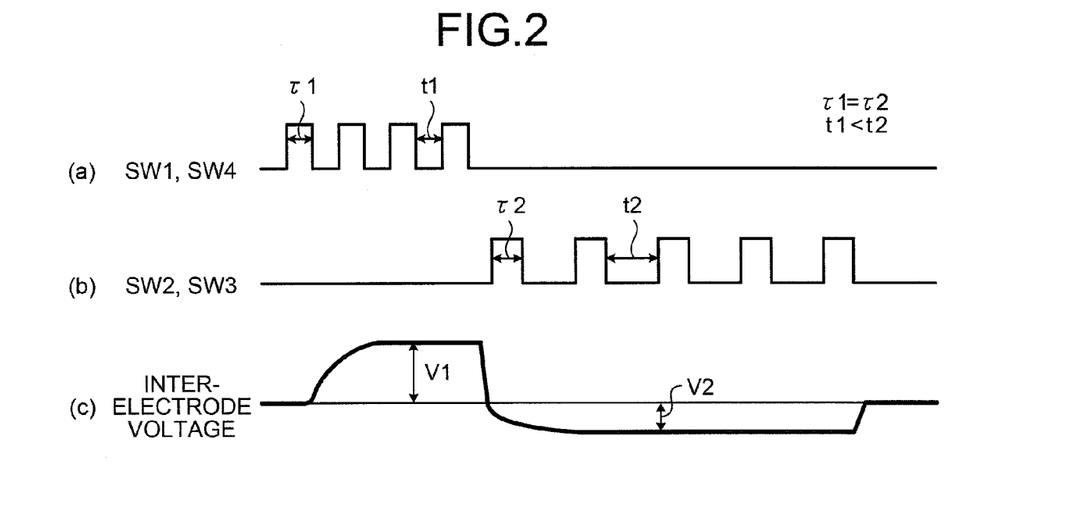
FIG. 2 depicts a drawing explaining an example of switching signal waveforms and an inter-electrode voltage waveform for the same time period (when no electric discharge occurs).

FIG. 2 depicts a drawing explaining an example of switching signal waveforms that are output from the controlling unit 4 and an inter-electrode voltage waveform for the same time period. More specifically, shown in FIG. 2(*a*) is a switching signal applied to the switching elements SW1 and SW4; shown in FIG. 2(*b*) is a switching signal applied to the switching elements SW2 and SW3; shown in FIG. 2(*c*) is an inter-electrode voltage waveform between the workpiece 11 and the machining-purpose electrode 12, the waveform being formed by the switching signals shown in FIGS. 2(*a*) and 2(*b*). It should be noted that the waveform shown in FIG. 2(*c*) is a voltage waveform that is obtained when no electric discharge occurs between the workpiece 11 and the machining-purpose electrode 12. A voltage waveform that is obtained when electric discharges occur will be explained later.

While an electric discharge is occurring between the workpiece 11 and the machining-purpose electrode 12, if the switching elements SW1 and SW4 are turned on, an electric current flows in a route as follows: the positive electrode of the DC power supply 10→the switching element SW1→the resistor 13→the workpiece 11→the machining-purpose electrode 12→the switching element SW4→the negative electrode of the DC power supply 10. In contrast, if the switching elements SW2 and SW3 are turned on, an electric current flows in a route as follows: the positive electrode of the DC power supply 10→the switching element SW3→the machining-purpose electrode 12→the workpiece 11→the resistor 13→the switching element SW2→the negative electrode of the DC power supply 10. In other words, while the switching elements SW1 and SW4 are turned on, a normal polarity machining process is performed, whereas while the switching elements SW2 and SW3 are turned on, a reversed polarity machining process is performed.

Next, the waveforms of the switching signals will be explained. As shown in FIGS. 2(*a*) and 2(*b*), with respect to a group of switching signals (hereinafter, a "normal polarity pulse group") applied to the switching elements SW1 and SW4, the pulse width is expressed as $\tau 1$, whereas the pulse pause width is expressed as t1. Further, with respect to a group of switching signals (hereinafter, a "reversed polarity pulse group") applied to the switching elements SW2 and SW3, the pulse width is expressed as $\tau 2$, whereas the pulse pause width is expressed as t2. In this situation, relationships expressed in the expressions shown below are satisfied between these set values.

$$\tau 1 = \tau 2 \tag{1}$$

$$t1 < t2 \text{ (if } V1 > V2 \text{ is satisfied)} \tag{2}$$

In this situation, each of the values V1 and V2 in Expression (2) shown above indicates the magnitude of the inter-electrode voltage that is obtained while the corresponding one of the pulse groups is being applied. For each of the pulse groups, the pulse width and the pulse pause width are set as shown in Expressions (1) and (2) above. As a result, within the same duration, the normal polarity pulse group has a longer pulse applying period. The inter-electrode voltage V1 for the normal polarity pulse group is higher than the inter-electrode voltage V2 for the reversed polarity pulse group. Thus, the relationship expressed as V1>V2 is satisfied.

As the number of pulses in the normal polarity pulse group is compared with the number of pulses in the reversed polarity pulse group with reference to FIGS. 2(*a*) and 2(*b*), it is observed that the number of pulses in the reversed polarity pulse group is larger. The reason is that the zero-volt control is being exercised. Simply put, for the purpose of configuring the normal polarity pulse applying period so as to be substantially equal to the reversed polarity pulse applying period within the same duration, the number of pulses in the reversed polarity pulse group, which has the larger pulse pause width, is arranged to be larger. Further details of the operation performed by the controlling unit 4, including the zero-volt control, will be explained later.

Figure 3:
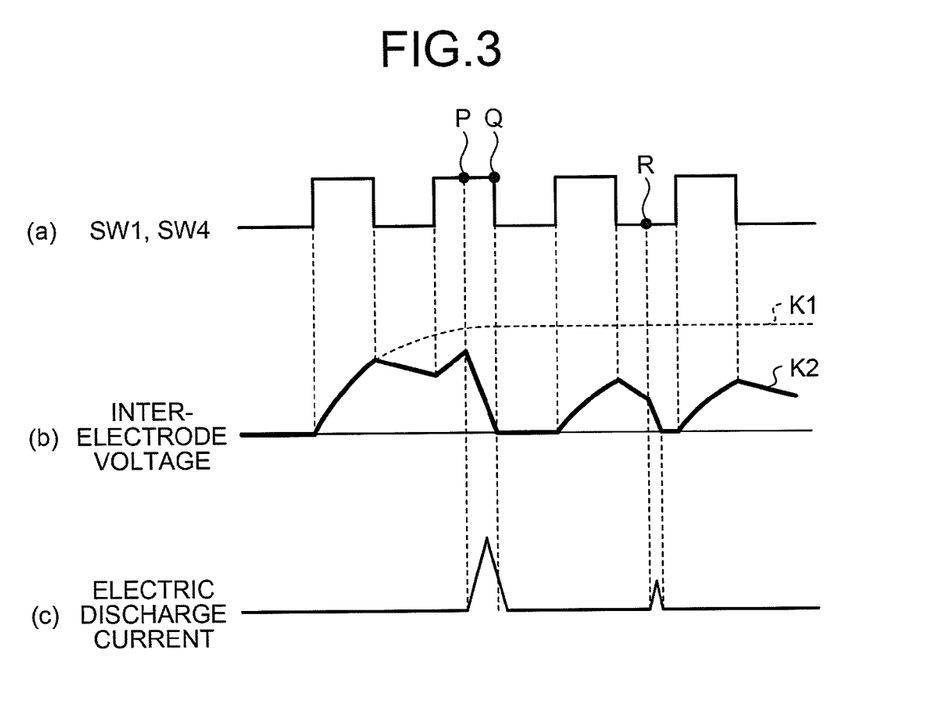
FIG. 3 depicts a drawing explaining a switching signal waveform, an inter-electrode voltage waveform for the same time period (when no electric discharge occurs and when electric discharges occur), and an electric discharge current waveform.

FIG. 3 depicts a drawing explaining an example of an inter-electrode voltage waveform that is obtained when electric discharges occur and an example of a waveform of an electric discharge current flowing between the workpiece 11 and the machining-purpose electrode 12. More specifically, shown in FIG. 3(*b*) is the inter-electrode voltage waveform that is obtained when electric discharges occur at points P and R shown in FIG. 3(*a*), while the switching signal shown in FIG. 3(*a*) is being applied. It should also be noted that, in FIG.

3(b), the waveform K1 indicated with a broken line is an inter-electrode voltage waveform obtained in the case where no electric discharge occurs, whereas the waveform K2 indicated with a solid line is an inter-electrode voltage waveform obtained in the case where the electric discharges occur. In the case where an electric discharge occurs at the point P shown in FIG. 3(a), electric power is supplied between the workpiece 11 and the machining-purpose electrode 12 from the DC power supply 10 in addition to the electric power stored in the stray capacitance 14. The electric power is supplied during a time period between the point P and the point Q at which the switching signal drops. As a result, the amount of electric discharge current is large, as shown in FIG. 3(c). In contrast, in the case where an electric discharge occurs at the point R shown in FIG. 3(a), only the electric power stored in the stray capacitance 14 is supplied and no electric power is supplied from the DC power supply 10. As a result, the amount of electric discharge current is small. As explained here, the electric discharges between the workpiece 11 and the machining-purpose electrode 12 occur not only during the time periods when the switching signal is on. It should be noted, however, that the larger the electric discharge current is, the larger is the amount of machining process being performed. For this reason, from the point of view of enhancing machining efficiency, a desirable condition is to, as much as circumstances allow, perform a machining process by having electric discharges occur during the time periods when the electric power can be supplied from the DC power supply 10, i.e., during the time periods when the switching signal is on.

Figure 4:
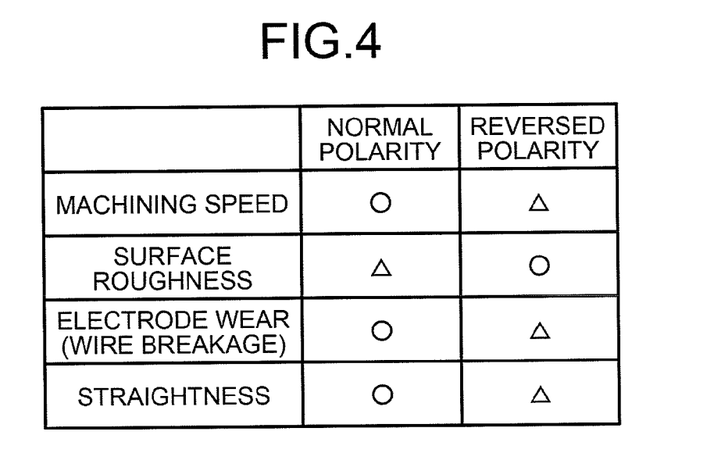
FIG. 4 depicts a table in which characteristics of a normal polarity machining process and a reversed polarity machining process are compared.

FIG. 4 is a table in which characteristics of the normal polarity machining process and the reversed polarity machining process are compared. In FIG. 4, "o" denotes a better grade than "Δ". In other words, "Δ" denotes a worse grade than "o". As understood from FIG. 4, it is desirable to perform a normal polarity machining process when the machining speed, electrode wear, or straightness is regarded as important in the machining process. In contrast, it is desirable to perform a reversed polarity machining process when the surface roughness is regarded as important in the machining process.

Figure 5:
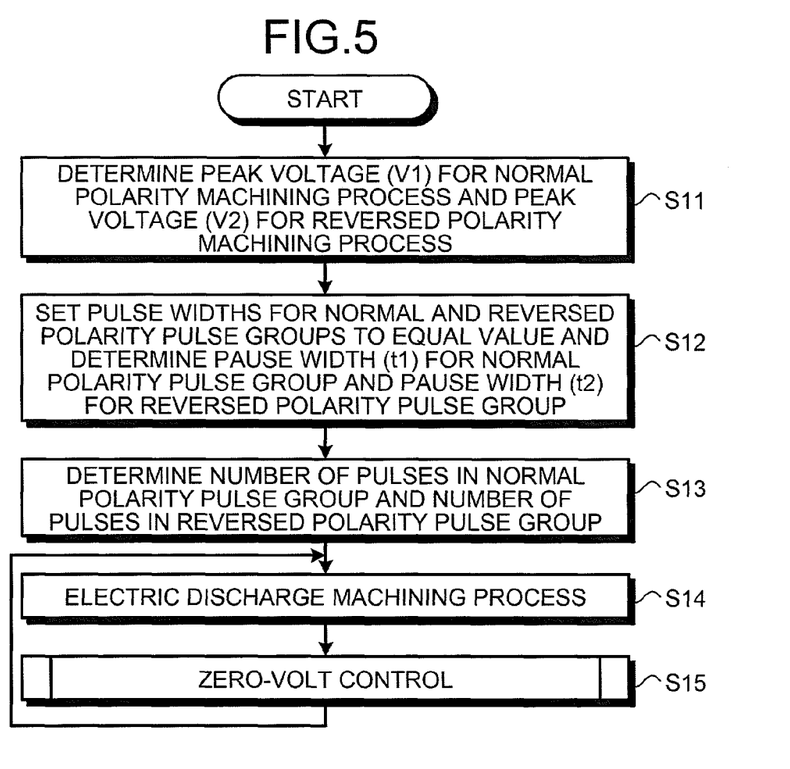
FIG. 5 depicts a flowchart of an operation performed by a controlling unit according to exemplary embodiments.
Figure 6:
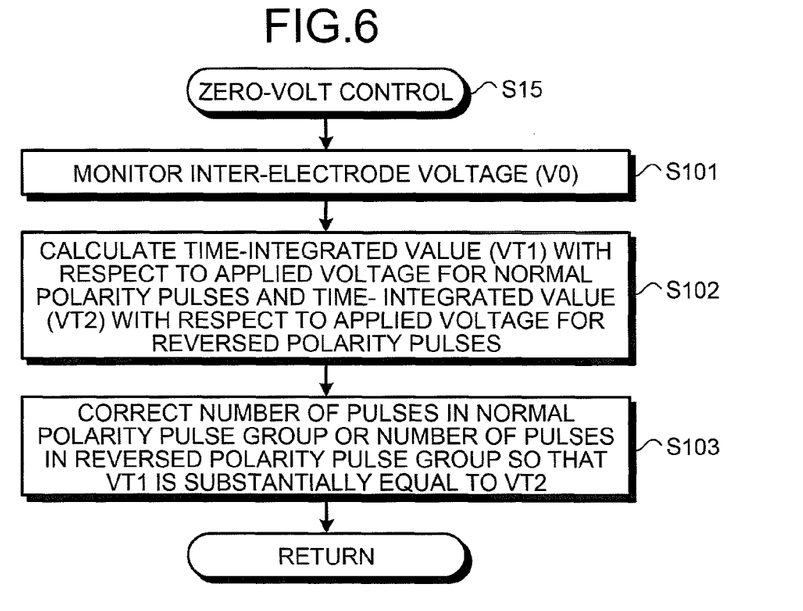
FIG. 6 depicts a flowchart of a zero-volt controlling process according to the exemplary embodiments.

Next, an operation performed by the controlling unit 4 will be explained, with reference to FIGS. 5 and 6. FIG. 5 is a flowchart of the operation performed by the controlling unit 4. FIG. 6 is a flowchart of the zero-volt controlling process included in the flowchart shown in FIG. 5. The operations shown in FIGS. 5 and 6 are performed under the control of the controlling unit 4.

In FIG. 5, the controlling unit 4 determines a peak voltage (V1) for a normal polarity machining process and a peak voltage (V2) for a reversed polarity machining process, based on the machining information that has been output from the operation recognition processing unit 7, as information that is required to perform an electric discharge machining process (step S11). Subsequently, the controlling unit 4 sets the pulse widths in such a manner that the pulse width in the normal polarity pulse group is equal to the pulse width in the reversed polarity pulse group. The controlling unit 4 also determines the pulse pause width (t1) in the normal polarity pulse group and the pulse pause width (t2) in the reversed polarity pulse group (step S12). In the case where the condition V1>V2 is satisfied as shown in FIG. 2(c), the controlling unit 4 determines the pulse widths τ1 and τ2 and the pulse pause widths t1 and t2 according to the conditions indicated in Expressions (1) and (2) shown above. In contrast, in the case where the machining process is performed under the condition V1<V2, the controlling unit 4 determines the pulse widths τ1 and τ2 and the pulse pause widths t1 and t2 according to conditions indicated in Expressions (3) and (4) shown below.

$$\tau 1 = \tau 2 \quad (3)$$

$$t1 > t2 \quad (4)$$

Returning to the description of the flowchart in FIG. 5, the controlling unit 4 determines the number of pulses in the normal polarity pulse group and the number of pulses in the reversed polarity pulse group, based on Expressions (1) and (2) shown above or Expressions (3) and (4) shown above (step S13). The numbers of pulses that are thus determined are called "basic pulse numbers", which are used for performing rough zero-volt control. Unless the zero-volt control at step S15 (explained later) needs to be performed, the basic pulse number for each of the pulse groups is not changed. The two polarity pulse groups (i.e., the normal polarity pulse group and the reversed polarity pulse group) that have been determined at steps S11 through S13 are applied between the workpiece 11 and the machining-purpose electrode 12, so that a desired electric discharge machining process is performed (step S14). After the zero-volt controlling process at step S15 has been performed, the processes at steps S14 and S15 are repeatedly performed. In the processing flowchart shown in FIG. 5, the conditions related to the normal and reversed polarity pulse groups are not changed while one electric discharge machining process is being performed; however, another arrangement is acceptable in which control is exercised so that settings of the normal and the reversed polarity pulse groups are changed, for example, when there is an interrupting process or when a process to change the machining conditions has been performed.

Further, as shown in FIG. 6, the voltage detector 16 monitors the inter-electrode voltage (V0) (step S101). Based on values of the inter-electrode voltage (V0) that are sequentially transferred from the voltage detector 16, the controlling unit 4 calculates a time-integrated value (VT1) with respect to the applied voltage for the normal polarity pulses and a time-integrated value (VT2) with respect to the applied voltage for the reversed polarity pulses (step S102). The controlling unit 4 corrects the number of pulses in the normal polarity pulse group or the number of pulses in the reversed polarity pulse group so that VT1 is substantially equal to VT2 (step S103). More specifically, with respect to one of the normal and the reversed polarity pulse groups, the controlling unit 4 performs a process of adding a predetermined number of pulses to the basic pulse number or a process of deleting a predetermined number of pulses from the basic pulse number. To perform the process of correcting the number of pulses, it does not matter whether the controlling unit 4 controls the number of pulses in the normal polarity pulse group or the number of pulses in the reversed polarity pulse group. For example, in the case where it is necessary to increase the number of pulses in the normal polarity pulse group, it is acceptable for the controlling unit 4 to perform a process of decreasing the number of pulses in the reversed polarity pulse group instead. On the contrary, in the case where it is necessary to decrease the number of pulses in the normal polarity pulse group, it is acceptable for the controlling unit 4 to perform a process of increasing the number of pulses in the reversed polarity pulse group instead.

Because phenomena like an electrolytic corrosion do not occur rapidly, it is acceptable to perform cycles of zero-volt controlling process at a relatively slow controlling speed. For this reason, at step S103 in FIG. 6 where VT1 is compared with VT2, it is acceptable to perform the comparing process while a threshold value used in the judgment is set to a large value.

In the case where a detecting system used for performing the zero-volt control is provided in parallel with the inter-electrode connection, there is a possibility that the degree of surface roughness may be degraded due to an increase in the stray capacitance. An essence of the zero-volt control lies in causing an average inter-electrode voltage to be zero volts. Thus, needless to say, at least when no electric discharge occurs between the electrodes, it is possible to design the number of output pulses by performing the process at step S13. In the case where the frequency with which the electric discharges occur is equal between the normal polarity and the reversed polarity, it is possible to cause the average inter-electrode voltage to be around zero volts if the controlling unit 4 achieves the designed outputs as described above, without the need to perform the zero-volt control (i.e., without the need to exercise control by using the voltage detector 16).

As explained above, when the electric discharge machining apparatus according to the first embodiment is used, it is possible to realize the function of arbitrarily varying the voltage applied between the machining-purpose electrode and the workpiece within the range of power supply voltage, without using a plurality of electric power supplies and without using a plurality of resistors, which are connected to the switching elements and have mutually different resistance values. As a result, it is possible to inhibit the structure of the apparatus from becoming complicated and to inhibit the number of components being used from increasing.

Further, when the electric discharge machining apparatus according to the first embodiment is used, it is possible to determine the optimal applied voltages for both of the polarities by configuring the pulse width in the normal polarity pulse group so as to be equal to the pulse width in the reversed polarity pulse group, and also, configuring the pulse pause width in the normal polarity pulse group so as to have a different value from that of the pulse pause width in the reversed polarity pulse group. As a result, it is possible to perform an excellent machining process that is suitable for each workpiece.

Second Embodiment

Figure 7:
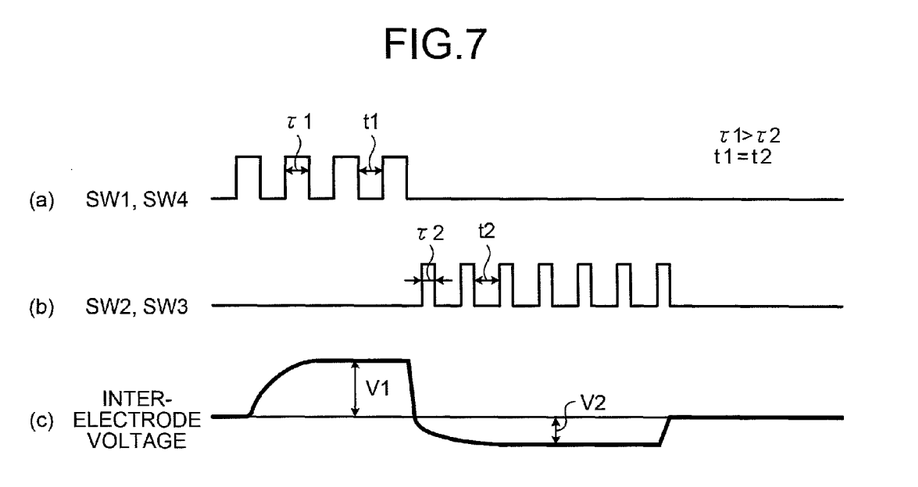
FIG. 7 depicts a drawing explaining an example of switching signal waveforms and an inter-electrode voltage waveform for the same time period according to a second embodiment of the present invention.

FIG. 7 depicts a drawing explaining an example of switching signal waveforms (that are different from those shown in FIG. 2) and an example of an inter-electrode voltage waveform for the same time period according to a second embodiment of the present invention. In the switching signal waveforms according to the first embodiment shown in FIG. 2, the pulse width in the normal polarity pulse group is configured so as to be equal to the pulse width in the reversed polarity pulse group, whereas the pulse pause width in the normal polarity pulse group is configured so as to have a different value from that of the pulse pause width in the reversed polarity pulse group. In contrast, in the switching signal waveforms according to the second embodiment, the pulse pause width in the normal polarity pulse group is configured so as to be equal to the pulse pause width in the reversed polarity pulse group, whereas the pulse width in the normal polarity pulse group is configured so as to have a different value from that of the pulse width in the reversed polarity pulse group. In other words, in the switching signal waveforms according to the second embodiment, the pulse pause widths are constant, while the pulse widths are mutually different. It should also be noted that, based on the applied voltage, the pulse widths and the pulse pause widths are determined, and also, the zero-volt control is performed, according to the processing flowcharts shown in FIGS. 5 and 6.

Next, the switching signal waveforms according to the second embodiment will be explained. Like in the example explained in the description of the first embodiment, in FIGS. 7(a) and 7(b), the pulse width in the normal polarity pulse group is expressed as $\tau1$, while the pulse pause width in the normal polarity pulse group is expressed as t1, whereas the pulse width in the reversed polarity pulse group is expressed as $\tau2$, while the pulse pause width in the reversed polarity pulse group is expressed as t2. In this situation, relationships expressed in the expressions shown below are satisfied between these set values.

$$\tau1 > \tau2 (V1 > V2) \tag{5}$$

$$t1 = t2 \tag{6}$$

Like in the example explained in the description of the first embodiment, each of the values V1 and V2 in Expression (5) shown above indicates the magnitude of the inter-electrode voltage that is obtained while the corresponding one of the pulse groups is being applied. For each of the pulse groups, the pulse width and the pulse pause width are set as shown in Expressions (5) and (6) above. As a result, as the inter-electrode voltage V1, which corresponds to the time period when the normal polarity pulse group is being applied, is compared with the inter-electrode voltage V2, which corresponds to the time period when the reversed polarity pulse group is being applied, it is observed that the inter-electrode voltage for the normal polarity pulse group is higher. This is because the normal polarity pulse group has a longer pulse applying period with respect to mutually the same duration. Thus, the relationship expressed as V1>V2 is satisfied.

In the case where a machining process is performed under the condition V1<V2, the pulse widths $\tau1$ and $\tau2$ as well as the pulse pause widths t1 and t2 can be determined according to the conditions indicated in Expressions (7) and (8) shown below.

$$\tau1 < \tau2 \tag{7}$$

$$t1 = t2 \tag{8}$$

Like in the example explained in the description of the first embodiment, as the number of pulses in the normal polarity pulse group is compared with the number of pulses in the reversed polarity pulse group, it is observed that the number of pulses in the reversed polarity pulse group is larger. The reason for this is the same as the reason explained in the description of the first embodiment. In other words, for the purpose of configuring the pulse applying periods for the normal and the reversed polarity pulse groups so as to be substantially equal with respect to mutually the same duration, the number of pulses in the reversed polarity pulse group, which has the smaller pulse width, is arranged to be larger.

As for the conditions shown in Expressions (5) and (7) that are used for determining the pulse pause widths t1 and t2 in the switching signal waveforms, the relationships shown in these expressions do not necessarily have to be satisfied precisely. The reason is that, even if the pulse pause width t1 and the pulse pause width t2 were not exactly equal to each other, it would be possible to control the total time period during which the switching signal is on and to control the applied voltage by performing the zero-volt control in a subsequent stage.

As explained above, when the electric discharge machining apparatus according to the second embodiment is used, it is possible to determine the optimal applied voltages for both of the polarities by configuring the pulse pause widths in the normal and the reversed polarity pulse groups so as to be equal, and configuring the pulse widths in the normal and the reversed polarity pulse groups so as to be different. As a result, it is possible to perform an excellent machining process that is suitable for each workpiece.

When the pulse pause width is extended in the switching signal waveforms according to the first embodiment, there is a possibility that the electric discharge frequency may become a lower frequency. On the contrary, in the switching signal waveforms according to the second embodiment, because the pulse pause widths are constant, it is possible to better prevent the electric discharge frequency from becoming a lower frequency, than in the example according to the first embodiment. Thus, an advantageous effect is achieved where it is possible to inhibit the machining efficiency from becoming degraded.

Third Embodiment

Figure 8:
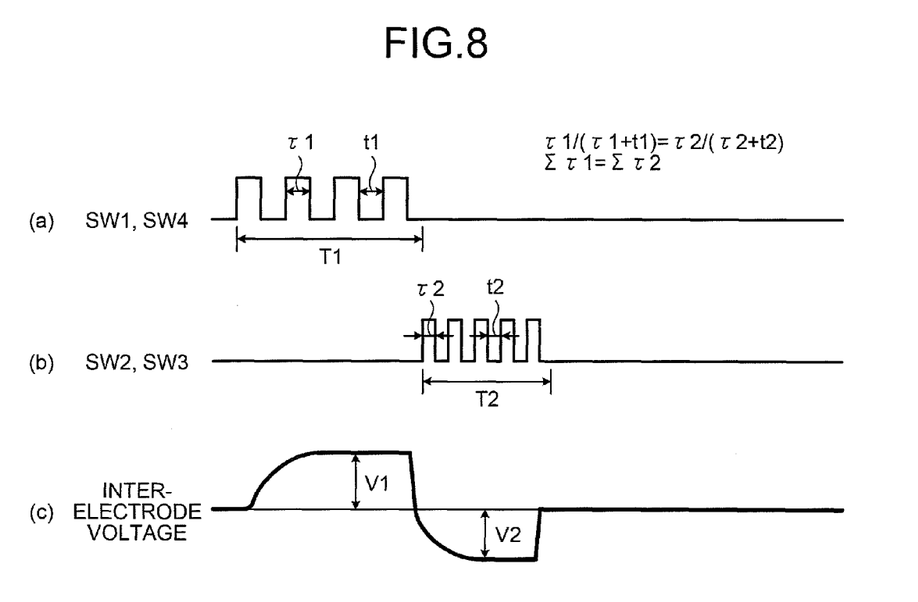
FIG. 8 depicts a drawing explaining an example of switching signal waveforms and an inter-electrode voltage waveform for the same time period according to a third embodiment of the present invention.

FIG. 8 depicts a drawing explaining an example of switching signal waveforms (that are different from those shown in FIG. 2 and FIG. 7) and an example of an inter-electrode voltage waveform for the same time period according to a third embodiment of the present invention. In the switching signal waveforms according to the first and the second embodiments shown in FIG. 2 and FIG. 7, the duty cycle (the ratio of the pulse width to the pulse period) of the normal polarity pulse group is configured so as to have a different value from the duty cycle of the reversed polarity pulse group. In contrast, in the switching signal waveforms according to the third embodiment, the duty cycle of the normal polarity pulse group is configured so as to be equal to the duty cycle of the reversed polarity pulse group. It should also be noted that, based on the applied voltage, the pulse widths and the pulse pause widths are determined, and also, the zero-volt control is performed, according to the processing flowcharts shown in FIGS. 5 and 6.

Next, the switching signal waveforms according to the third embodiment will be explained. Like in the examples explained in the descriptions of the first and the second embodiments, in FIGS. 8(a) and 8(b), the pulse width in the normal polarity pulse group is expressed as $\tau 1$, while the pulse pause width in the normal polarity pulse group is expressed as t1, whereas the pulse width in the reversed polarity pulse group is expressed as $\tau 2$, while the pulse pause width in the reversed polarity pulse group is expressed as t2. In this situation, relationships expressed in the expressions shown below are satisfied between these set values.

$$\tau 1/(\tau 1+t1)=\tau 2/(\tau 2+t2) \quad (9)$$

$$\Sigma \tau 1=\Sigma \tau 2 \quad (10)$$

In the example shown in FIG. 8, in the case where the duty cycles are equal to each other, the electric charge stored in the stray capacitance 14 is constant. In this case, the inter-electrode voltage that is obtained while the normal polarity pulse group is being applied is equal to the inter-electrode voltage that is obtained while the reversed polarity pulse group is being applied. In other words, the amount of electric current that flows in from the stray capacitance 14 is substantially the same for both of the pulse groups. However, because the electric discharge sustaining period depends on the pulse width, the amount of electric current that flows in from the DC power supply 10 is different when the pulse width is different. For this reason, even if the inter-electrode voltages that are obtained while the normal and the reversed polarity pulse groups are being applied are equal to each other, it is possible to vary the manner in which the machining process is performed, by configuring the pulse widths to be different from each other.

In the example shown in FIG. 8, assuming the time period during which the normal polarity pulse group is applied is expressed as T1 and the time period during which the reversed polarity pulse group is applied is expressed as T2, the total time period during which the pulses can be applied is shorter for the reversed polarity pulse group, because the reversed polarity pulse group has a smaller pulse pause width. As a result, a relationship expressed as T1>T2 is established. These switching signal waveforms are suitable in a situation, for example, where the user desires to have a longer electric discharge period for a normal polarity machining process or where the user desires to increase the electric discharge current during a normal polarity machining process and decrease the electric discharge current during a reversed polarity machining process. By using these switching signal waveforms, it is possible to perform an efficient and effective electric discharge machining process.

As explained above, when the electric discharge machining apparatus according to the third embodiment is used, the duty cycles of the normal and the reversed polarity pulse groups are configured so as to be equal. Thus, an advantageous effect is achieved where it is possible to perform an efficient and effective electric discharge machining process.

Fourth Embodiment

Figure 9:
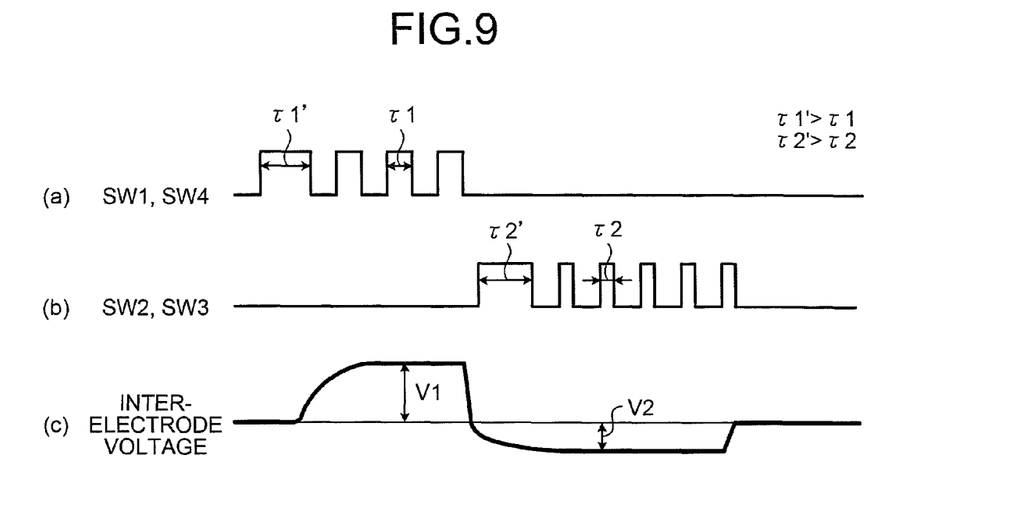
FIG. 9 depicts a drawing explaining an example of switching signal waveforms and an inter-electrode voltage waveform for the same time period according to a fourth embodiment of the present invention.

FIG. 9 depicts a drawing explaining an example of switching signal waveforms (that are different from those shown in FIG. 2, FIG. 7, and FIG. 8) and an example of an inter-electrode voltage waveform for the same time period according to a fourth embodiment of the present invention. The switching signals according to the fourth embodiment are different from the switching signal waveforms according to the third embodiment in that the pulse width of the first pulse in each of the normal and the reversed polarity pulse groups is configured so as to be longer (i.e., larger) than the pulse width of each of the second and following pulses. The rest of the configuration is the same as the configuration according to the third embodiment. It should also be noted that, based on the applied voltage, the pulse widths and the pulse pause widths are determined, and also, the zero-volt control is performed, according to the processing flowcharts shown in FIGS. 5 and 6.

Next, the switching signal waveforms according to the fourth embodiment will be explained. In FIGS. 9(a) and 9(b), the pulse width of the first pulse is expressed as $\tau 1'$, while the pulse width of each of the second and following pulses in the normal polarity pulse group is expressed as $\tau 1$, whereas the pulse width of the first pulse in the reversed polarity pulse group is expressed as $\tau 2'$, while the pulse width of each of the second and following pulses is expressed as $\tau 2$. In this situation, relationships expressed in the expressions shown below are satisfied between these set values.

$$\tau 1'>\tau 1 \quad (11)$$

$$\tau 2'>\tau 2 \quad (12)$$

As shown in FIG. 9, in the case where the pulse width of the first pulse in each of the pulse groups is configured so as to be longer, it is possible to make the rising portion of the inter-electrode voltage longer. It is thus possible to more quickly cause the voltage value in the first drop appearing the inter-electrode voltage waveform K2 in FIG. 3 to be close to the peak value in the inter-electrode voltage waveform K1 corresponding to a situation where no electric discharge occurs. With this arrangement, it is possible to make the timing with which the electric discharge is started earlier than the timing that is used when the switching signal waveforms according to third embodiment are applied. As a result, it is possible to secure a valid machining period for each of the pulse groups. Thus, it is possible to enhance the machining efficiency.

As explained above, when the electric discharge machining apparatus according to the fourth embodiment is used, the pulse width of the first pulse in each of the pulse groups is configured so as to be larger than the pulse width of each of the second and following pulses. Thus, an advantageous effect is achieved where it is possible to effectively secure a valid machining period and to enhance the machining efficiency.

Fifth Embodiment

Figure 10:
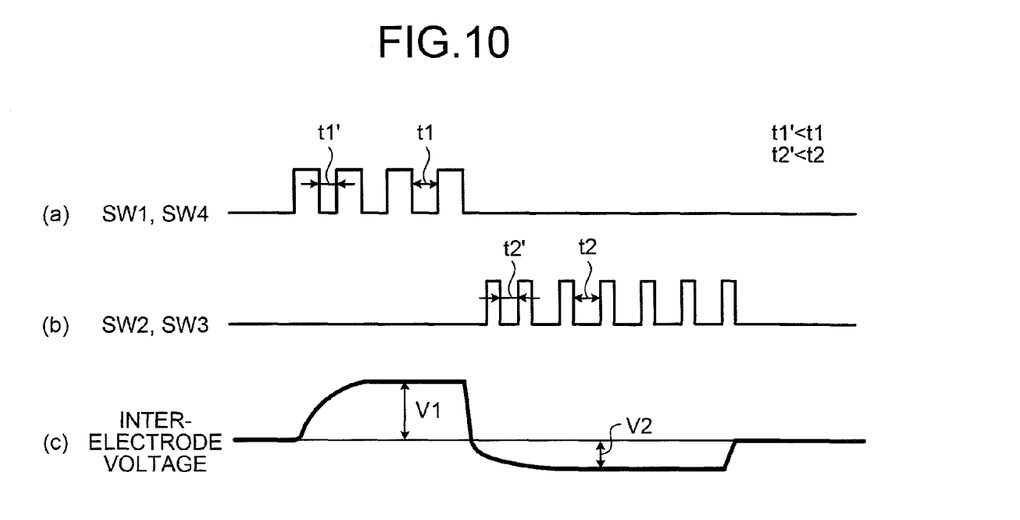
FIG. 10 depicts a drawing explaining an example of switching signal waveforms and an inter-electrode voltage waveform for the same time period according to a fifth embodiment of the present invention.

FIG. 10 depicts a drawing explaining an example of switching signal waveforms (that are different from those shown in FIGS. 2, 7 to 9) and an inter-electrode voltage waveform for the same time period according to a fifth embodiment of the present invention. The switching signals according to the fifth embodiment are different from the switching signal waveforms according to the third embodiment in that the pulse pause width between the first pulse and the second pulse in each of the normal and the reversed polarity pulse groups is configured so as to be longer (i.e., larger) than each of the pulse pause widths for the other pulses. The rest of the configuration is the same as the configuration according to the third embodiment. It should also be noted that, based on the applied voltage, the pulse widths and the pulse pause widths are determined, and also, the zero-volt control is performed, according to the processing flowcharts shown in FIGS. 5 and 6.

Next, the switching signal waveforms according to the fifth embodiment will be explained. In FIGS. 10(a) and 10(b), the pulse pause width between the first pulse and the second pulse in the normal polarity pulse group is expressed as t1', while each of the pulse pause widths for the second and following pulses is expressed as t1, whereas the pulse pause width between the first pulse and the second pulse in the reversed polarity pulse group is expressed as t2', while each of the pulse pause widths for the second and following pulses is expressed as t2. In this situation, relationships expressed in the expressions shown below are satisfied between these set values.

$$t1' < t1 \quad (13)$$

$$t2' < t2 \quad (14)$$

As shown in FIG. 10, in the case where the pulse pause width between the first pulse and the second pulse is configured so as to be longer, it is possible to shorten the portion where the inter-electrode voltage drops after a rise. It is thus possible to shorten the time period corresponding to the portion where the inter-electrode voltage waveform K2 drops between the first pulse and the second pulse, for example, in the inter-electrode voltage waveform K2 shown in FIG. 3. With this arrangement, it is possible to cause the inter-electrode voltage to rise more quickly than when the switching signal waveforms according to third embodiment are applied. As a result, like in the fourth embodiment, it is possible to secure a valid machining period for each of the pulse groups. Thus, it is possible to enhance the machining efficiency.

As explained above, when the electric discharge machining apparatus according to the fifth embodiment is used, the pulse pause width between the first pulse and the second pulse in each of the pulse groups is configured so as to be longer than each of the pulse pause widths for the other pulses. Thus, an advantageous effect is achieved where it is possible to effectively secure a valid machining period and to enhance the machining efficiency.

Sixth Embodiment

Figure 11:
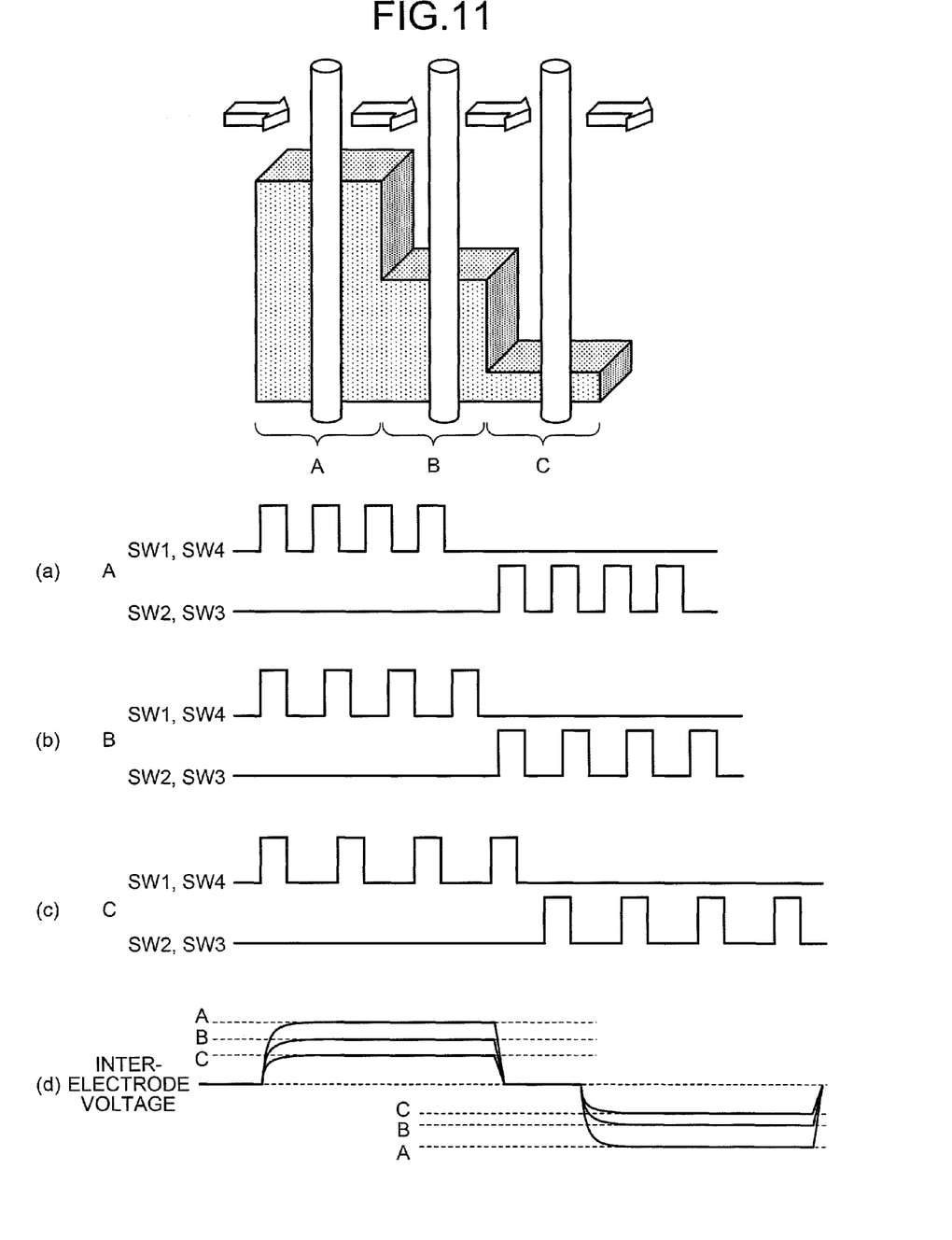
FIG. 11 depicts a drawing explaining an example of switching signal waveforms that are suitable for performing a machining process on a workpiece having mutually different thicknesses.

FIG. 11 depicts a drawing explaining an example of switching signal waveforms that are suitable for performing a machining process on a workpiece having mutually different thicknesses. More specifically, shown in FIG. 11(a) is a switching signal waveform that is used when a machining process is performed on a portion "A" in a workpiece; shown in FIG. 11(b) is a switching signal waveform that is used when a machining process is performed on a portion "B" in the workpiece; and shown in FIG. 11(c) is a switching signal waveform that is used when a machining process is performed on a portion "C" in the workpiece.

In the example shown in FIG. 11, the inter-electrode voltage waveform is arranged to be variable by configuring the pulse widths in the pulse groups so as to be constant and making the pulse pause widths different. In other words, the pulse pause widths are set in such a manner that, the larger the thickness of the workpiece is, the shorter is the pulse pause width; conversely, the smaller the thickness of the workpiece is, the longer is the pulse pause width.

Figure 12:
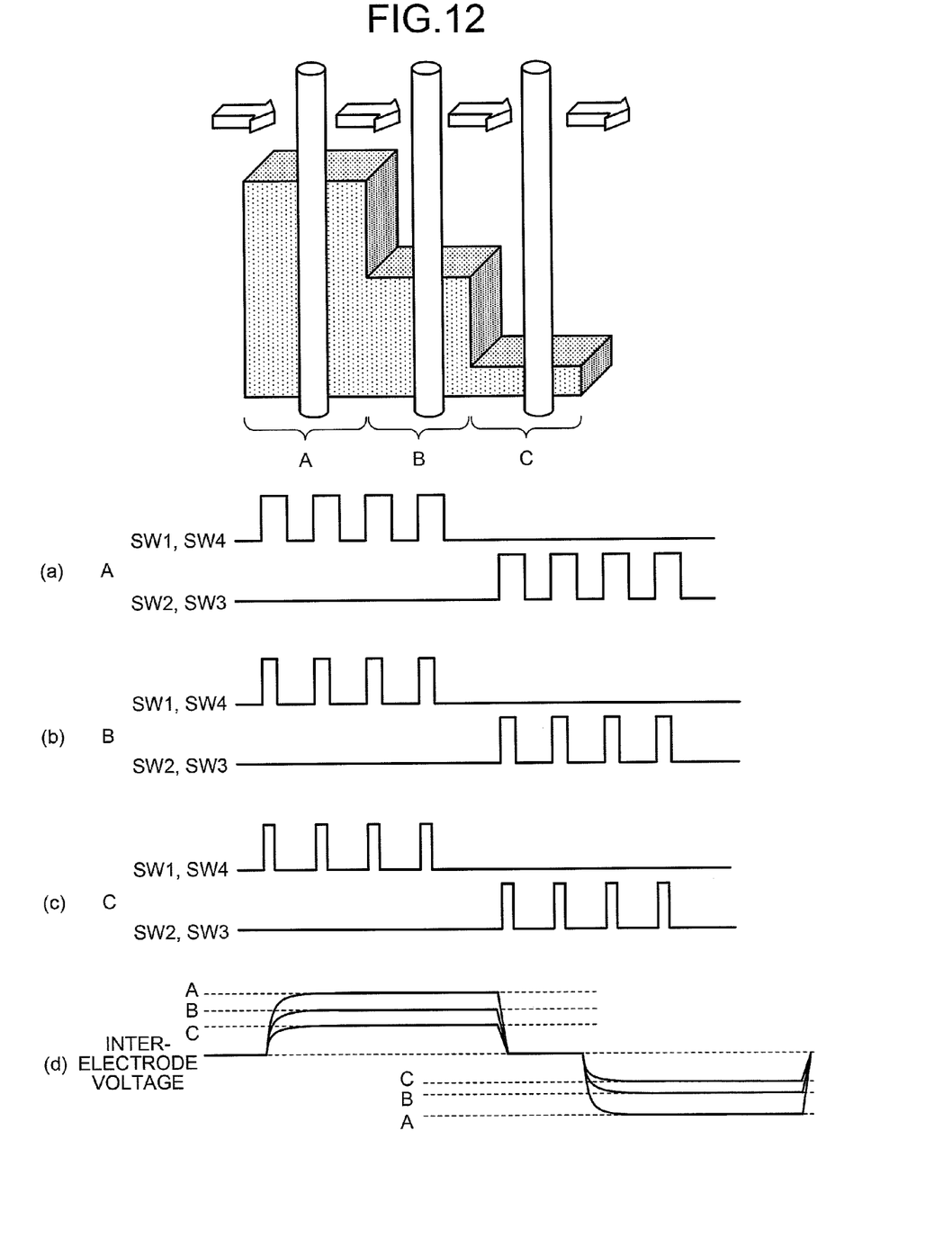
FIG. 12 depicts a drawing explaining an example of switching signal waveforms that are different from those shown in FIG. 11.

FIG. 12 depicts a drawing explaining an example of switching signal waveforms that are different from those shown in FIG. 11. Like in the example shown in FIG. 11, shown in (a) is a switching signal waveform that is used when a machining process is performed on the portion "A" in the workpiece; shown in (b) is a switching signal waveform that is used when a machining process is performed on the portion "B" in the workpiece; and shown in (c) is a switching signal waveform that is used when a machining process is performed on the portion "C" in the workpiece.

In the example shown in FIG. 12, the inter-electrode voltage waveform is arranged to be variable by configuring the pulse pause widths in the pulse groups so as to be constant and making the pulse widths different. In other words, the pulse widths are set in such a manner that, the larger the thickness of the workpiece is, the longer is the pulse width. Conversely, the smaller the thickness of the workpiece is, the shorter is the pulse width.

As explained above, in the switching signal waveforms shown in FIG. 11, the pulse widths in the pulse groups are arranged to be constant, while the pulse pause widths are arranged to be different. In contrast, in the switching signal waveforms shown in FIG. 12, the pulse pause widths in the pulse groups are arranged to be constant, while the pulse widths are arranged to be different. It is important to note that the duty cycles of the pulse groups are arranged to be different corresponding to the thickness for the machining process. Accordingly, the duty cycles are set in such a manner that, the larger the thickness of the workpiece is, the larger is the duty cycle. Conversely, the smaller the thickness of the workpiece is, the smaller is the duty cycle. In this situation, it does not matter if the pulse widths and/or the pulse pause widths are mutually different.

Figure 13:
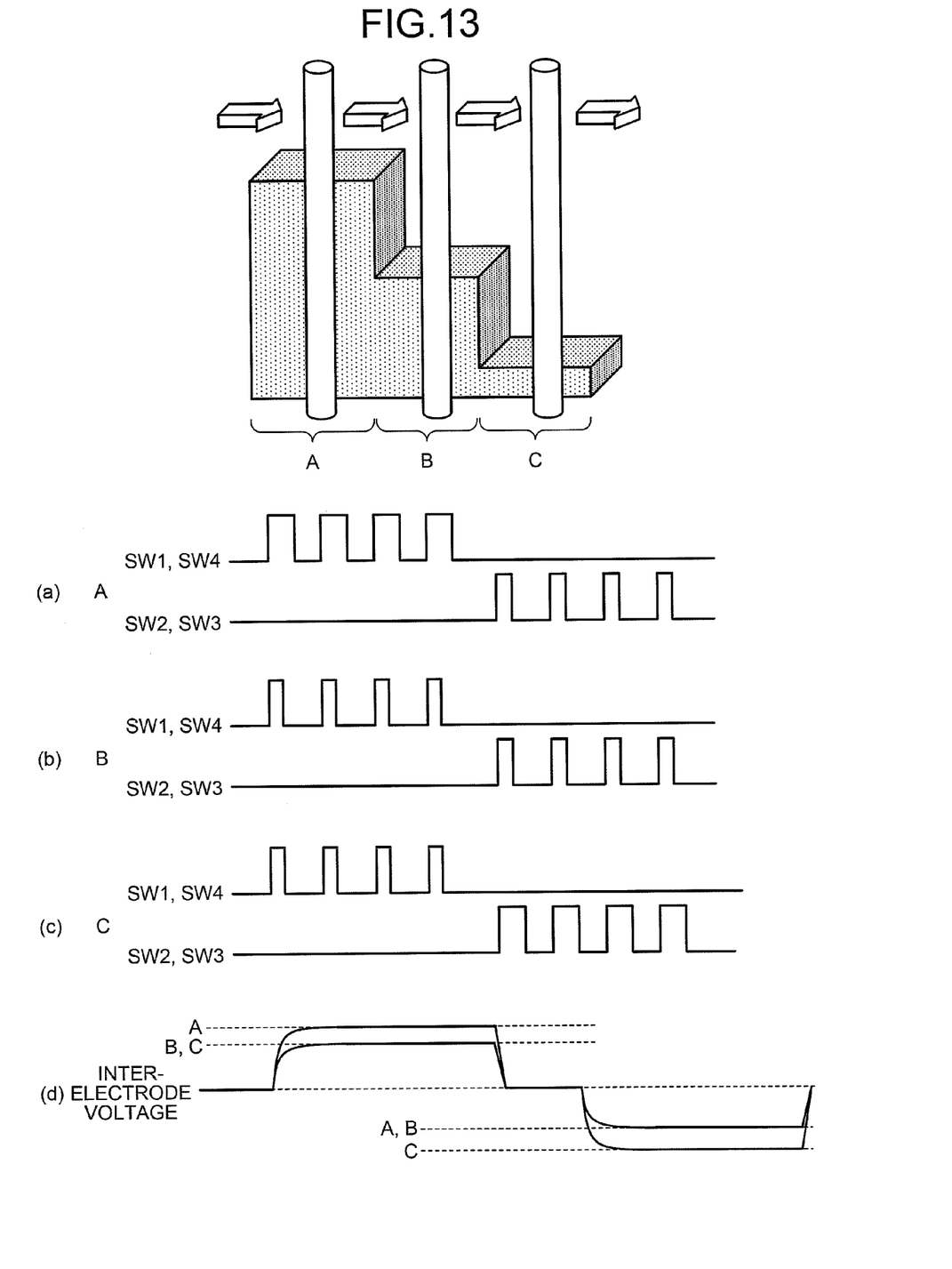
FIG. 13 depicts a drawing explaining an example of switching signal waveforms that are different from those shown in FIG. 11 and FIG. 12.

FIG. 13 depicts a drawing explaining an example of switching signal waveforms that are different from those shown in FIG. 11 and FIG. 12. Shown in (a) is a switching signal waveform that is used when a machining process is performed on the portion "A" in the workpiece; shown in (b) is a switching signal waveform that is used when a machining process is performed on the portion "B" in the workpiece; and shown in (c) is a switching signal waveform that is used when a machining process is performed on the portion "C" in the workpiece.

Of the switching signal waveforms described above, in the example shown in FIG. 11, indicated are switching signal waveforms to be used when, for instance, the machining speed and straightness are regarded as more important than surface roughness. In contrast, in the example shown in FIG. 12, indicated are switching signal waveforms to be used when the machining speed and straightness are regarded as more important than surface roughness, and also, the machining speed and straightness are both desired to be at satisfactory levels. In addition, in the example shown in FIG. 13, indicated are switching signal waveforms to be used when electrode wear is regarded as important, and also, electrode wear and straightness are both desired to be at satisfactory levels.

For example, considering the fact that straightness is a more important issue in an area having a large thickness, it can be assumed that, for an area having a small thickness, it is acceptable to select a waveform with which the degree of surface roughness should not be degraded, even though the degree of straightness may be degraded. As another example, when a workpiece has a large thickness, the machining speed has, due to a large machining volume, a greater tendency to become lower than when a workpiece has a small thickness. Thus, in the case where the user desires to work at similar machining speeds no matter what the thickness of the workpiece is, it is a good idea to select such a waveform that has a lower inter-electrode voltage for a smaller thickness and a higher inter-electrode voltage for a larger thickness. Combinations of waveforms that will achieve an optimal machining process greatly vary depending on, for example, the environment in which the machining process is performed, the machining conditions, the targeted level of precision, and the targeted machining speed. Thus, the waveforms to be used may be arbitrarily selected.

As explained above, when the electric discharge machining apparatus according to the sixth embodiment is used, the normal and the reversed polarity machining pulse groups are formed by combining the various switching signal waveforms that are described in the first to the fifth embodiments. Thus, even in the case where it is necessary to perform machining processes on workpieces having mutually different thicknesses continuously, it is possible to perform flexible and efficient machining processes while taking the machining speed, surface roughness, straightness, electrode wear, and the like into consideration.

The switching signal waveforms that are shown in FIGS. 11 to 13 are examples. Needless to say, it is acceptable to use any other various switching signal waveforms that are generated based on different points of view.

INDUSTRIAL APPLICABILITY

As explained above, the electric discharge machining apparatus and the electric discharge machining method according to an aspect of the present invention is useful as an invention with which it is possible to inhibit the structure of the apparatus from becoming complicated and to inhibit the number of components being used and the number of types of components being used from increasing.

The invention claimed is:

1. An electric discharge machining apparatus that applies a plurality of sequential voltage pulses between a machining-purpose electrode and a workpiece and performs a machining process while switching polarities for each certain number of voltage pulses, the electric discharge machining apparatus comprising:
    an electric power supply device that supplies a direct-current voltage;
    a full-bridge circuit in which four switching elements are connected in a full-bridge connection, the full-bridge circuit having a pair of direct-current terminals, to which the electric power supply device is connected, and a pair of alternating-current terminals, to which the machining-purpose electrode and the workpiece are connected, the full-bridge circuit being configured to convert the direct-current voltage supplied from the electric power supply device to a voltage pulse for performing a normal polarity machining process and to a voltage pulse for performing a reversed polarity machining process, and to output the voltage pulses resulting from the conversions; and
    a controlling unit that, based on machining information that is required to perform an electric discharge machining process, generates switching signals containing a normal polarity pulse group and a reversed polarity pulse group used for controlling an output timing of the voltage pulses output from the full-bridge circuit and controls the four switching elements by using the generated switching signals, wherein
    within a waveform of the switching signals, a duty cycle of the normal polarity pulse group formed of a plurality of normal polarity pulses is configured so as to be different from a duty cycle of the reversed polarity pulse group formed of a plurality of reversed polarity pulses.

2. The electric discharge machining apparatus according to claim 1, wherein
    the duty cycle of the normal polarity pulse group and the duty cycle of the reversed polarity pulse group are configured such that each of pulse widths in the pulse groups are substantially equal, whereas each of pulse pause widths in the pulse groups are different.

3. The electric discharge machining apparatus according to claim 1, wherein
    the duty cycle of the normal polarity pulse group and the duty cycle of the reversed polarity pulse group are configured such that each of pulse pause widths in the pulse groups are substantially equal, whereas each of pulse widths in the pulse groups are different.

4. The electric discharge machining apparatus according to claim 1, wherein
    the controlling unit sets one or more items that are regarded as important out of the following: machining speed; surface roughness; electrode wear; and straightness, and
    the controlling unit determines the switching signal based on the one or more items regarded as important that have been determined.

5. The electric discharge machining apparatus according to claim 1, wherein
    the controlling unit exercises control so that a time-integrated value with respect to an applied voltage for the normal polarity pulses included in the normal polarity pulse group is substantially equal to a time-integrated value with respect to an applied voltage for the reversed polarity pulses included in the reversed polarity pulse group.

6. An electric discharge machining apparatus that applies a plurality of sequential voltage pulses between a machining-purpose electrode and a workpiece and performs a machining process while switching polarities for each certain number of voltage pulses, the electric discharge machining apparatus comprising:

an electric power supply device that supplies a direct-current voltage;

a full-bridge circuit in which four switching elements are connected in a full-bridge connection, the full-bridge circuit having a pair of direct-current terminals, to which the electric power supply device is connected, and a pair of alternating-current terminals, to which the machining-purpose electrode and the workpiece are connected, the full-bridge circuit being configured to convert the direct-current voltage supplied from the electric power supply device to a voltage pulse for performing a normal polarity machining process and to a voltage pulse for performing a reversed polarity machining process, and to output the voltage pulses resulting from the conversions; and a controlling unit that, based on machining information that is required to perform an electric discharge machining process, generates switching signals containing a normal polarity pulse group and a reversed polarity pulse group used for controlling an output timing of the voltage pulses output from the full-bridge circuit and controls the four switching elements by using the generated switching signals, wherein within a waveform of the switching signals, a duty cycle of the normal polarity pulse group formed of a plurality of normal polarity pulses is configured so as to be substantially equal to a duty cycle of the reversed polarity pulse group formed of a plurality of reversed polarity pulses, and one of a pulse width and a pulse pause width of the normal polarity pulse group is different from that of the reversed polarity pulse group.

7. An electric discharge machining apparatus that applies a plurality of sequential voltage pulses between a machining-purpose electrode and a workpiece and performs a machining process while switching polarities for each certain number of voltage pulses, the electric discharge machining apparatus comprising:

an electric power supply device that supplies a direct-current voltage;

a full-bridge circuit in which four switching elements are connected in a full-bridge connection, the full-bridge circuit having a pair of direct-current terminals, to which the electric power supply device is connected, and a pair of alternating-current terminals, to which the machining-purpose electrode and the workpiece are connected, the full-bridge circuit being configured to convert the direct-current voltage supplied from the electric power supply device to a voltage pulse for performing a normal polarity machining process and to a voltage pulse for performing a reversed polarity machining process, and to output the voltage pulses resulting from the conversions; and a controlling unit that, based on machining information that is required to perform an electric discharge machining process, generates switching signals containing a normal polarity pulse group and a reversed polarity pulse group used for controlling an output timing of the voltage pulses output from the full-bridge circuit and controls the four switching elements by using the generated switching signals, wherein in a case where the workpiece has plural different thicknesses, duty cycles in waveforms of the switching signals for respective thickness are configured so as to be different.

* * * * *